(12) United States Patent
Ku

(10) Patent No.: US 8,352,330 B2
(45) Date of Patent: Jan. 8, 2013

(54) METHOD, MEDIUM, AND SYSTEM FOR RETURNING CASH POINTS TO A USER IN RESPONSE TO A PURCHASE REQUEST

(75) Inventor: Young Bae Ku, Seoul (KR)

(73) Assignee: GMmarket Inc., Seoul (KR)

( * ) Notice: Subject to any disclaimer, the term of this patent is extended or adjusted under 35 U.S.C. 154(b) by 214 days.

(21) Appl. No.: 12/470,871

(22) Filed: May 22, 2009

(65) Prior Publication Data

US 2010/0235230 A1 Sep. 16, 2010

(30) Foreign Application Priority Data

May 22, 2008 (KR) ........................ 10-2008-0047412

(51) Int. Cl.
*G06Q 30/00* (2012.01)
(52) U.S. Cl. .................................................... 705/26.41
(58) Field of Classification Search .................... 705/26, 705/27, 26.1, 27.1, 26.41
See application file for complete search history.

(56) References Cited

U.S. PATENT DOCUMENTS

| | | | | |
|---|---|---|---|---|
| 7,191,145 | B1 * | 3/2007 | Lunetta et al. ............... | 705/26.5 |
| 7,454,367 | B2 * | 11/2008 | Yu et al. ........................ | 705/26.8 |
| 2003/0163333 | A1 * | 8/2003 | Podgurny et al. ............. | 705/1 |
| 2004/0153333 | A1 * | 8/2004 | Oshima et al. ................ | 705/1 |
| 2005/0096955 | A1 * | 5/2005 | Sorensen ....................... | 705/8 |
| 2005/0289017 | A1 * | 12/2005 | Gershom ....................... | 705/27 |
| 2006/0010044 | A1 * | 1/2006 | Harris ............................ | 705/26 |
| 2007/0192210 | A1 * | 8/2007 | Lunetta et al. ................. | 705/26 |
| 2008/0162305 | A1 * | 7/2008 | Rousso et al. ................. | 705/27 |

FOREIGN PATENT DOCUMENTS

| KR | 10-2000-0054487 A | 9/2000 |
|---|---|---|
| KR | 10-2003-0023900 A | 3/2003 |

OTHER PUBLICATIONS

Nov. 21, 2008—http://web.archive.org/web/20081121031223/http://www.staatinc.com/our_service.html.*

* cited by examiner

*Primary Examiner* — Matthew Zimmerman
(74) *Attorney, Agent, or Firm* — Saliwanchik, Lloyd & Eisenschenk

(57) ABSTRACT

Methods and systems for electronic commerce are provided in which a buyer requests a merchandise estimate by selecting estimate items registered by a seller, selects one of various estimates suggested by the seller in response to the request, and performs payment for the merchandise. One method for providing electronic commerce includes receiving, from a buyer terminal, an estimate request selecting at least one of a plurality of items from estimate request information registered by a seller terminal, providing at least one estimate to a buyer according to an estimate response from the seller terminal, and receiving an estimate rejection or a purchase request in response to the at least one estimate from the buyer terminal and performing a corresponding process.

15 Claims, 9 Drawing Sheets

☐ Estimate Request Information

Select from the following items and request estimate. Here, when estimate request information is used to request estimate, 1000 points are deducted from reserve cash, mileage, stamp, coupon, or other cash points of buyer, and are returned upon payment.

☒ Maker
- ☐ Hyundai  ☐ Kia  ☐ Samsung  ☐ Foreign car

☒ Model
- ☐ Sedan  ☐ Jeep  ☐ Truck  ☐ Special car

☒ Engine Displacement
- ☐ 1500 cc or less  ☐ 2500 cc or less  ☐ Above 2500 cc

☒ Number of Cars (5% discounted for two or more cars)
- ☐ One  ☐ Two  ☐ Three  ☐ Four Request for estimate

FIG. 4

☐ Estimate Request List

| Buyer | | Buyer Reliability Information | Contact Information | Destination | Automatic estimate |
|---|---|---|---|---|---|
| AAA | Detailed information | +10 | XX-XXX-XXXX | Jeju-do | ✓ |
| BBB | Detailed information | +20 | XX-XXX-XXXX | Jeju-do | ✓ |
| CCC | Detailed information | -8 | XX-XXX-XXXX | Busan | ✓ |
| ○○○○ | | ○○○○ | ○○○○ | ○○○○ | ○○○○ |

FIG. 5

☐ Estimate 1

This is a guide to requested estimate.

☐ Goods Information
    Hyundai Grandeur    XXXX
    Price    XXXX won
    Color    W, S, B, G
    Delivery Period    Three to Five Days ☐ Check color and number of cars upon request for purchase.

☐ 5% discount for two or more cars

[Request for Purchase]

☐ Estimate 2

This is a guide to requested estimate.

☐ Goods Information
    Hyundai Grandeur    △△△△
    Price    OOOO won
    Color    W, S, B, G
    Delivery Period    Three to Five Days ☐ Check color and number of cars upon request for purchase.

☐ 5% discount for two or more cars

[Request for Purchase]

☐ Estimate 3

This is a guide to requested estimate.

☐ Goods Information
    Hyundai Santafe    XXXX
    Price    XXXX won
    Color    W, S, B, G
    Delivery Period    Three to Five Days ☐ Check color and number of cars upon request for purchase.

☐ 5% discount for two or more cars

[Request for Purchase]

☐ Estimate 4

This is a guide to requested estimate.

☐ Goods Information
    Kia Mohave    △△△△
    Price    OOOO won
    Color    W, S, B, G
    Delivery Period    Two to Four Days ☐ Check color and number of cars upon request for purchase.

☐ 5% discount for two or more cars

[Request for Purchase]

FIG. 7

METHOD, MEDIUM, AND SYSTEM FOR RETURNING CASH POINTS TO A USER IN RESPONSE TO A PURCHASE REQUEST

CROSS-REFERENCE TO RELATED APPLICATION

This application claims the benefit under 35 U.S.C. §119 of Korean Patent Application No. 10-2008-0047412, filed May 22, 2008, which is hereby incorporated by reference in its entirety.

BACKGROUND

1. Field

The present invention relates to a method and system for brokering transactions of merchandise via a medium such as the Internet. Instead of using a simple marketplace operating scheme in which merchandise are delivered by selecting the merchandise and paying a price of the merchandise, a method and system is provided in which a buyer requests an estimate from a seller by selecting estimate items registered by the seller, selects one of various estimates suggested by the seller in response to the request, and performs payment.

2. Description of the Related Art

Nowadays, there are many on-line shopping malls that manage electronic commerce, such as by brokering the trading of goods or services on the Internet. The on-line shopping malls enable buyers to conveniently purchase a variety of goods or services registered by sellers from within their own homes.

Brokerage methods currently used in on-line shopping malls include a method by which buyers select and purchase goods or services for which prices and conditions are registered by sellers, and an auction or reverse-auction method. The auction is advantageous to sellers because the auction is won by a highest bidding buyer, and the reverse auction is advantageous to buyers because the reverse auction is won by a lowest bidding seller. Accordingly, the auction is not conducive to transactions at prices and conditions that are advantageous to buyers and thus it is not easy to induce many buyers to bid. Meanwhile, the reverse auction is not conducive to transactions at prices and conditions that are advantageous to sellers and thus it is not easy to induce many sellers to bid.

A combination of the auction and the reverse auction has been used to overcome the shortcomings of both methods. For example, a buyer can negotiate for a different price or conditions than suggested by a seller and purchase merchandise at the resulting price and conditions. When the negotiation is unsuccessful, the buyer can attempt to negotiate with other sellers for purchase of desired merchandise. However, this negotiation-based electronic commerce is limited due to the conflict between a buyer desiring discount and a seller desiring higher price.

In addition, there is also a method in which a plurality of sellers respond to an estimate from a buyer, who selects the sellers one by one for negotiation. However, this estimate bidding scheme creates increased indirect transaction costs for both parties when price and conditions are not smoothly negotiated between a buyer and a seller.

Accordingly, there is a need for an on-line marketplace that allows a buyer and a seller to advantageously use electronic commerce at no extra charge through various appropriate estimates.

BRIEF SUMMARY

One aspect of an embodiment of the present invention is directed to a method and system for providing electronic commerce that enable a buyer to request an estimate based on information registered by a seller, to select a desired estimate from amongst those provided by the seller, to pay a price of merchandise, and to receive delivered merchandise. The information registered by the seller may include previously registered merchandise, options for overcoming a minor difference of merchandise rather than a price estimate, among other possibilities. Advantages of the present invention include, diversifying markets, providing strategic estimates for sale induction, acquiring more seller members in open markets, and fostering widespread electronic commerce, among other advantages.

Another aspect of an embodiment of the present invention is directed to a method and system for providing electronic commerce in which an estimate request and selection require reserve cash, mileage, stamps, coupons, or other cash points of a buyer, which are returned upon purchase, payment, or expiration of the request, such that only true potential buyers can receive meaningful estimates and time and effort for unnecessary estimate response by the seller can be reduced.

Yet another aspect of an embodiment of the present invention is directed to a method and system for providing electronic commerce in which estimates provided by a seller and managed in a database are used as information for a purchase request, such that the buyer can select the estimate and purchase merchandise based only on the contents of the estimate.

According to an aspect of the present invention, there is provided a method for providing electronic commerce through an estimate request and response, the method including: receiving, from a buyer terminal, an estimate request comprising the selection of at least one of a plurality of estimate request information registered by a seller terminal; providing at least one estimate to a buyer according to an estimate response from the seller terminal; and receiving an estimate rejection or a purchase request in response to the at least one estimate from the buyer terminal and performing a corresponding process.

The method further may include, before receiving the estimate request, deducting cash points, including at least one of transferred cash, reserve cash, mileage, a stamp, and a coupon, of the buyer on the condition that the points are returned when there is no estimate response from a seller within a set period or upon a request for purchase based on the estimate.

The method may further include, after performing the corresponding process, managing the estimate as an estimated merchandise list of a seller in a database; and providing the estimated merchandise list to the buyer terminal upon receipt of a request for a search form or a merchandise sale screen of the seller from the buyer terminal, so that an estimate is directly selected for purchase.

The receiving of the estimate request may include selecting option items or a purchase number item for goods or services as merchandise.

The providing of the at least one estimate may include providing all information corresponding to the selected item, or a combination of one or more estimates including information corresponding to items excluding at least one item when a plurality of items are selected.

The providing of the at least one estimate may include an automatic estimate response, automatically produced and provided estimate in response to the estimate request, or a manually input estimate response, manually input by the seller via a seller terminal in response to the estimate request.

The performing of the corresponding process may include receiving a purchase request using any one of a plurality of estimates provided as a list or an enumeration on one screen to the buyer terminal, performing payment, transmitting a contract report to the seller, and managing delivery.

The method may further include performing billing and payment at an estimate price determined by the seller according to a discount rate when the buyer orders a plurality of merchandise at one time using one estimate, or at a price determined according to a discount rate registered by the seller when the buyer orders a plurality of merchandise through several orders using a plurality of estimates before the seller delivers the merchandise.

According to another aspect of an embodiment of the present invention, there is provided a method for providing electronic commerce, including: managing at least one estimate as an estimated merchandise list of a seller in a database; providing the estimated merchandise list to a terminal upon receipt of a request for a search form or a merchandise sale screen of the seller from the terminal; receiving a selection of any estimate from the estimated merchandise list, and processing a purchase corresponding to the selected estimate.

According to still another aspect of an embodiment of the present invention, there is provided an on-line market system that supports electronic commerce, the system including: an estimate request manager for registering estimate request information received from a seller terminal including a plurality of option items, providing the estimate request information upon receipt of a request from a buyer terminal, and receiving an estimate request made by a buyer by selecting at least one of the plurality of option items via the buyer terminal; and an estimate provider for providing at least one estimate to the buyer according to an estimate response from the seller terminal in response to the estimate request, wherein the estimate request manager receives an estimate rejection or a purchase request from the buyer terminal in response to the at least one estimate and controls performing a corresponding process.

The system may further include a point manager that deducts cash points from an account of a buyer when the estimate request manager provides the estimate request information to the buyer terminal, wherein the point manager deducts a predetermined amount of points from the cash points upon the estimate request, and returns the deducted points upon the purchase request. The cash points may also be returned when there is no estimate response from a seller within a predetermined period. The cash points may include reserve cash, mileage, stamps, or coupons, among other commodities.

The system may also include: a billing processor for performing billing at an estimate price discounted by the seller when the buyer orders a plurality of merchandise at one time using one estimate, or at a price determined according to a discount rate registered by the seller when the buyer orders a plurality of merchandise through several orders using a plurality of estimates before the seller delivers the merchandise; and a payment processor for performing a payment process according to the billing calculated by the billing processor.

The estimate provider may provide the estimate as a list or enumeration to the buyer terminal on one screen.

According to yet another aspect of an embodiment of the present invention, there is provided an on-line market system that supports electronic commerce, the system including: a database for managing at least one estimate as an estimated merchandise list of a seller; an estimated merchandise manager for providing the estimated merchandise list extracted from the database to a terminal upon receipt of a request for a search form or a merchandise sale screen of the seller from the terminal; and an estimate request manager for processing a purchase requested by the terminal by selecting any estimate from the estimated merchandise list.

BRIEF DESCRIPTION OF THE DRAWINGS

The above and other features and advantages of the present invention will become more apparent to those of ordinary skill in the art by describing in detail preferred exemplary embodiments thereof with reference to the attached drawings in which:

FIG. 4 illustrates an example estimate request information interface that allows option item selection and an estimate request by a buyer according to an exemplary embodiment of the present invention;

FIG. 5 illustrates an example estimate request list for presentation on a seller terminal according to an exemplary embodiment of the present invention;

FIG. 7 illustrates an exemplary interface through which a seller may respond to an estimate request from a buyer with various estimates according to an embodiment of the present invention;

DETAILED DESCRIPTION

Figure 1:
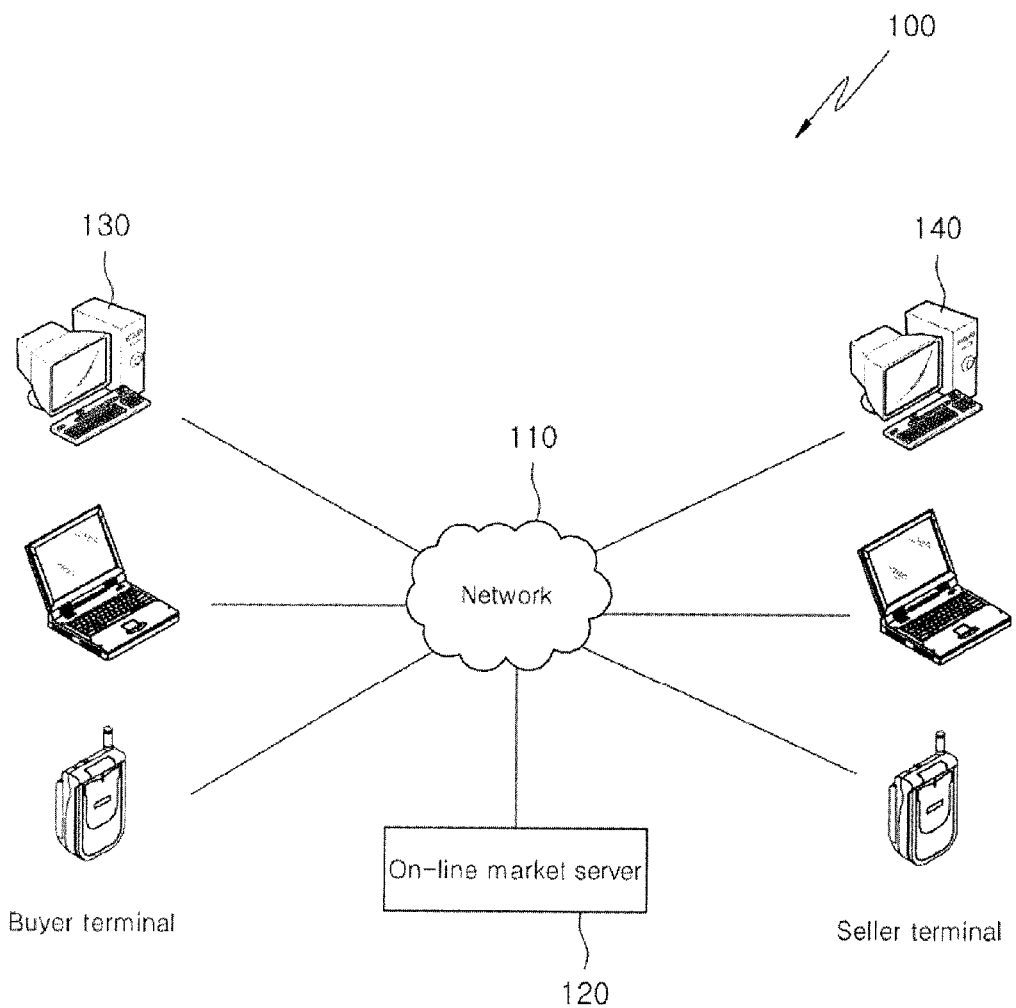
FIG. 1 illustrates an on-line market system according to an exemplary embodiment of the present invention.

The present invention relates to a method and system for providing electronic commerce in which a merchandise transaction brokering server enables a buyer to request an estimate from a seller by selecting estimate items registered by the seller, to select one of various estimates suggested by the seller in response to the request, and to perform payment. In a further embodiment of the invention, the estimates from the seller are managed in a database and used as information for a purchase request including a merchandise description and price. In another embodiment, before the buyer may request an estimate, the buyer must surrender cash points which are returned upon purchase, payment, or expiration of the request.

The subject matter of the present invention is described with specificity to meet statutory requirements. But this description is not intended to limit the scope of this patent. Rather, the inventors have contemplated that the claimed subject matter might also be embodied in other ways, to include different steps or combinations of steps similar to those described in this document, in conjunction with other present or future technologies.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, formats, and numerous other details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

The present invention will be described more fully hereinafter with reference to the accompanying drawings, in which exemplary embodiments of the invention are shown. The drawings are hereby incorporated in their entirety. This invention may, however, be embodied in many different forms and should not be construed as limited to the exemplary embodiments set forth herein. Rather, these exemplary embodiments are provided so that this disclosure will be sufficiently thorough and complete to fully enable those skilled in the art to embody and practice the invention. Like reference numerals refer to like elements throughout the drawings and specification.

FIG. 1 illustrates an on-line market system 100 according to an exemplary embodiment of the present invention. Referring to FIG. 1, the on-line market system 100 according to an exemplary embodiment of the present invention may include a network 110, an on-line market server 120, a buyer terminal 130, and a seller terminal 140.

The network 110 may be a wired or wireless network, including the Internet. Alternatively, the network 110 may be a core network integrated with a wired public network, a wireless mobile network, or mobile Internet. In one embodiment, the on-line market server 120 operates an on-line shopping mall over the network 110 and brokers general sale, auction, reverse auction, negotiation, or the like for merchandise between sellers and buyers. The on-line market server 120 can register a variety of merchandise of the sellers received from the seller terminal 140 over the network 110, and provide information regarding the registered merchandise to the buyer terminal 130 over the network 110, so that a buyer can purchase desired merchandise.

In a particular embodiment, the on-line market server 120 may also support electronic commerce through an estimate request made by the buyer selecting option items for merchandise (e.g., goods or services) and a response using various estimate request information of the seller, as described below. In one embodiment, the estimate request deducts reserve cash points of the buyer, and estimates suggested by the seller may be used as information for a purchase request for directly purchasing the merchandise.

The merchandise may include not only goods or services having general brands, but also goods such as handicrafts made at home, returned discounted goods, used goods, co-purchased goods and the like, and services intellectual or physical, such as interior construction, general construction, architecture, legal services and the like, which cannot easily be traded on-line due to properties of markets and goods or related laws.

In a further embodiment, the on-line market server 120 may also process payment for merchandise that the buyer selects from a list of merchandise, provide payment information to the seller so that the merchandise can be delivered to the buyer, and provide a location tracking service for the merchandise and a tracking-result inquiry service.

The buyer terminal 130 and the seller terminal 140 are generally computers, such as desktop personal computers (PCs) or notebook PCs, but are not limited thereto. For example, the buyer terminal 130 and the seller terminal 140 may be any kind of network element that can access the on-line market server 120 over the network 110. For example, the buyer terminal 130 and the seller terminal 140 may be mobile terminals such as cellular phones, Personal Communications Service (PCS) phones, or synchronous/asynchronous International Mobile Telecommunication (IMT)-2000 terminals that are in communication via wireless or mobile Internet. Alternatively, the buyer terminal 130 and the seller terminal 140 may be any wired and wireless customer electronics/communication devices having a user interface for accessing the on-line market server 120, such as palm PCs, Personal Digital Assistants (PDAs), smart phones, Wireless Application Protocol (WAP) phones, and mobile game machines (e.g., PlayStation Portable).

In a particular embodiment of the present invention, to support electronic commerce through an estimate request and response for merchandise, the on-line market server 120 may open the estimate request to only a plurality of verified sellers depending on a seller setting when receiving the estimate request, including the seller setting for seller designation, from the buyer terminal 130. Accordingly, the on-line market server 120 may receive estimates from the seller terminal 140 of sellers who desire to provide the merchandise in response to the estimate request, and provide the estimates to the buyer terminal 130 for brokerage of negotiation with the buyer. When an estimate request is received from the buyer terminal 130, at least one estimate may be provided to the buyer according to an estimate response from the seller terminal 140. In a further embodiment, the estimate request from the buyer includes selection of at least one of a plurality of option items from estimate request information registered by the seller terminal 140. The buyer terminal 130 may then confirm receipt of the estimate and transmit an estimate rejection or a purchase request in response to the on-line market server 120. The on-line market server 120 may then perform a corresponding process as further described below.

The estimate request from the buyer terminal 130 may require cash points to be deducted from an account of the buyer on the condition that the cash points are returned when there is no estimate response from a seller within a predetermined period or upon a request for purchase. The case points may include cash, reserve cash, mileage, stamps, and coupons, among other commodities.

In a further embodiment, the estimates from the seller terminal 140 may be managed as an estimated merchandise list of the seller in a database. Accordingly, when the buyer terminal 130 requests a search form or a merchandise sale screen of the seller, the on-line market server 120 may provide the estimated merchandise list to the buyer terminal 130 so that the buyer directly selects the estimate to purchase merchandise.

In a particular embodiment, the on-line market server 120 enables a buyer to request an estimate for desired merchandise by selecting estimate request information registered by a seller. The on-line market server 120 may further enable the buyer to select a desired estimate from a corresponding estimate and related estimates provided by the seller. The on-line market server 120 may further enable the buyer to pay a price for the corresponding merchandise and initiate delivery thereof.

In a particular embodiment, the on-line market server 120 only enables on-line estimate request and selection by a buyer after reserving cash points of the buyer on the condition that the cash points are returned upon payment. This feature ensures that only true potential buyers receive the estimates and therefore may reduce time and effort required for the seller to unnecessarily respond with estimates for negative buyers (such as buyers with less interest or bogus buyers). As described above, the estimates managed in the database according to an estimate from the seller may be used as information for a purchase request, such that the buyer can directly select the estimate and purchase merchandise based only on the estimate content without other detailed description of the merchandise.

Figure 2:
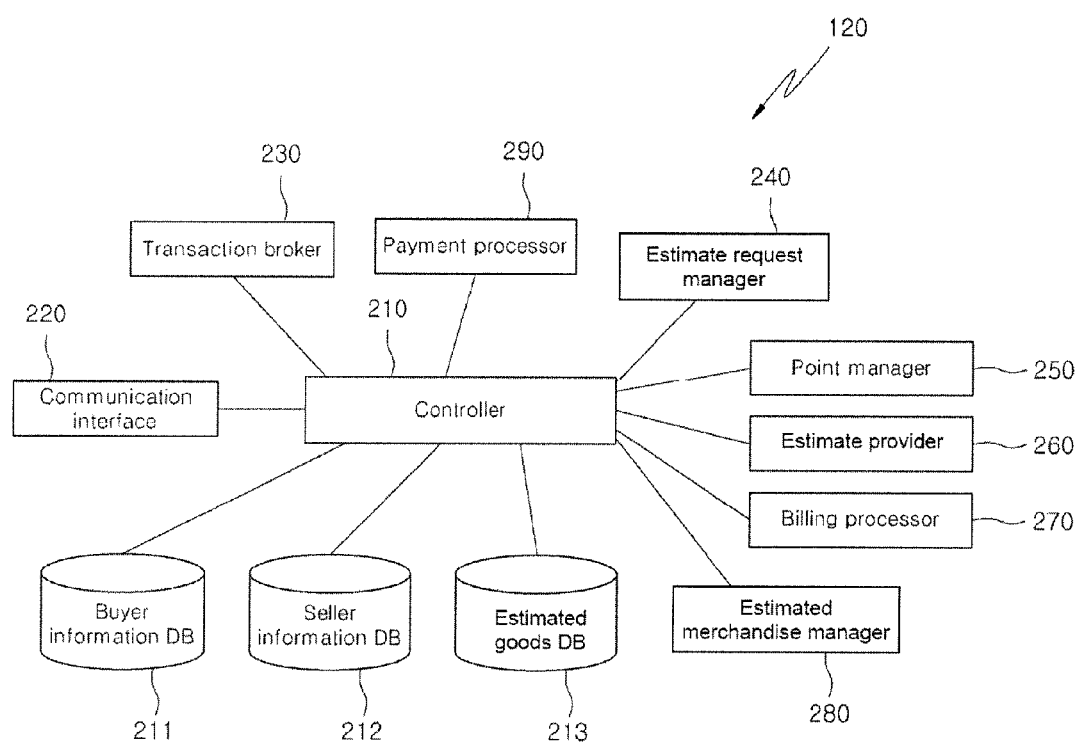
FIG. 2 is a detailed block diagram illustrating an on-line market server according to an exemplary embodiment of the present invention.

FIG. 2 is a detailed block diagram illustrating an on-line market server, such as the on-line market server 120, according to an exemplary embodiment of the present invention. The on-line market server illustrated in FIG. 2 includes a controller 210, a buyer information database (DB) 211, a seller information DB 212, an estimated merchandise DB 213, a communication interface 220, a transaction broker 230, an estimate request manager 240, a point manager 250, an estimate provider 260, a billing processor 270, an estimated merchandise manager 280, and a payment processor 290.

The controller 210 is a processor for basically controlling merchandise registration by sellers, merchandise purchase by buyers, and delivery of paid merchandise, and for additionally performing overall control of the components of the on-line market server, in order to provide electronic commerce service brokering a transaction of merchandise between sellers and buyers. In order to support electronic commerce through an estimate request and response for merchandise according to the present invention, the controller 210 controls electronic commerce brokerage based on an estimate request received through the buyer terminal 130 and various estimates received through the seller terminal 140 in response to the estimate request. In a particular embodiment, the estimate request from the buyer terminal comprises the selection of one or more of option items. The controller 210 controls receipt, from the buyer terminal 130, of the estimate rejection or purchase request responsive to the estimates from the seller and performs a relevant process in response. Under control of the controller 210, when the estimate request is received from the buyer terminal 130, cash points including at least one of transferred cash, reserve cash, mileage, a stamp, and a coupon are deducted from an account of the buyer, and when the buyer makes a purchase request, the cash points are returned. In addition, the controller 210 controls receipt, from the seller terminal 140, of estimates to be managed as an estimated merchandise list of a seller in the estimated merchandise DB 213, and accordingly, may broker purchase by providing the estimated merchandise list to the buyer terminal 130 so that the buyer can directly select an estimate from the estimated merchandise list when the buyer terminal 130 requests a search form or a merchandise sale screen of the seller.

Figure 3:
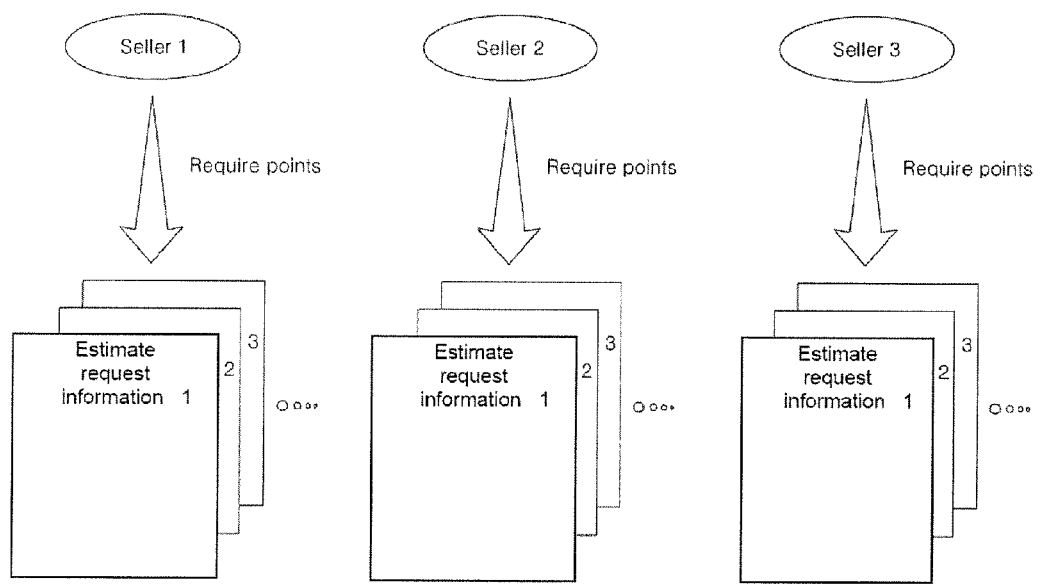
FIG. 3 illustrates estimate request information provided by sellers according to an exemplary embodiment of the present invention.

The seller terminal 140 may access the on-line market server 120 over the network 110 and use transaction brokerage service for merchandise provided by the on-line market server 120 via wired or wireless communication made by the communication interface 220. The seller may subscribe to the service provided by the on-line market server 120 using the seller terminal 140. Seller information registered by the subscribed seller, such as a seller ID, a password, contact information, prices of merchandise for sale, brands of merchandise, features of merchandise, and the like, is stored in the seller information DB 212. In particular, the estimate request manager 240 may receive estimate request information to be used when attempting to produce an estimate request for registered merchandise, through the seller terminal 140, and manage the estimate request information in the seller information DB 212. A variety of estimate request information may be registered and managed according to goods or services registered as merchandise by the seller, as shown in FIG. 3. The estimate request information may be managed as several items so that a buyer can select various estimate options to be used for an estimate request according to features of the merchandise as illustrated in FIG. 4, instead of directly inputting the estimate options, for easy and efficient information exchange between the seller and the buyer. When estimate request information for merchandise whose estimate can be requested is registered, a deduction of cash points of a buyer requesting the estimate may also be registered. For example, a deduction of cash points, such as cash, mileage, a stamp, and a coupon of the buyer, which can be redeemed for cash, may be registered as money or a score.

The buyer terminal 130 may also access the on-line market server 120 over the network 110 and use transaction brokerage service for merchandise provided by the on-line market server 120 via wired or wireless communication made using the communication interface 220. The buyer may subscribe to the service provided by the on-line market server 120 using the buyer terminal 130. Buyer information registered by the subscribed buyer, such as a buyer ID, a password, contact information, shopping basket information, information on merchandise bid on, information on merchandise purchased by auction, information on merchandise being negotiated, information on paid merchandise, delivery information, and information on whether a decision to purchase has been made are stored in the buyer information DB 211.

In order to broker a transaction of merchandise registered by the seller as described above, the transaction broker 230 may provide the information on the Merchandise for sale stored in the seller information DB 212 to the buyer terminal 130 through web pages, or may search for merchandise corresponding to a search key word input by the buyer terminal 130 based on names or contents of merchandise and provide a list of the merchandise to the buyer terminal 130 through the web pages.

When the buyer selects a payment request for immediate purchase or estimate acceptance for desired merchandise, the transaction broker 230 may provide payment screen information for the seller's merchandise to the buyer terminal 130 through web pages. The buyer selects or inputs buyer-related information (e.g., a buyer name, an ID, a telephone number, etc.), payment object information, money, delivery destination, a payment method (e.g., credit card, direct deposit, real-time funds transfer, cyber money, etc.) and the like on a screen for payment displayed on the buyer terminal 130 based on payment screen information. In response to a payment request from the buyer inputting all required information on the payment screen, the payment processor 290 performs the payment via an authentication procedure using a certificate. Unless the buyer receiving the merchandise requests return or refund of the merchandise, the payment processor 290 may calculate money according to a fee policy and send the money to a seller account after being notified of approval such as a decision to purchase from the buyer terminal 130.

Meanwhile, in order to support electronic commerce through an estimate request and response for merchandise according to the present invention, the estimate request manager 240 may provide an estimate request screen including merchandise information and an estimate guide when the buyer terminal 130 designates merchandise for the estimate request. Estimate request information for an estimate request including a plurality of option items available for an estimate request as shown in FIG. 4 may be included on the estimate request screen of the buyer terminal 130. At this point, the point manager 250 may deduct cash points (e.g., transferred cash, reserve cash, mileage, a stamp, or a coupon) from an account of the buyer on the condition that the deducted cash points are returned upon a purchase request or expiration of the estimate request. The buyer may select fields of relevant items among a plurality of option items on the screen as shown in FIG. 4, so that content required for a desired estimate is included. For example, a buyer desiring to purchase a car may select desired items in fields of option items such as a maker, a model, and an engine displacement, and also select a number in a field of a purchase number item, such as the number of cars, as illustrated in FIG. 4. When items required for the estimate request are all selected, the buyer may click on an 'estimate request' tag through the buyer terminal 130 and transmit the estimate request including selection information. In a particular embodiment, when the estimate request is received from the buyer terminal 130, the point manager 250 deducts a predetermined amount of points from the reserve cash points of the buyer. Although not shown, in an embodiment of the invention, before clicking on the 'estimate request' tag, the buyer may select the type of cash points to be deducted among reserve cash, mileage, a stamp, a coupon, or other commodities.

Although the estimate request for car purchase has been described by way of example; the seller may register and update, through the seller terminal 140, estimate request information including fields such as several option items and a purchase number item required for estimate for goods such as handicrafts made at home, returned discounted goods, used goods, co-purchased goods and the like, and services intellectual or physical, such as interior construction, general construction, architecture, legal services and the like, which cannot easily be traded on-line due to properties of markets and goods or related laws, as well as merchandise having general brands.

When necessary fields of option items in the estimate request information (option items or a purchase number item for goods or services as merchandise) are all selected and the estimate request is received from the buyer terminal 130, the estimate request manager 240 sends an estimate request including such content to a related seller, such that the seller can respond to the estimate request.

The estimate request manager 240 may provide an estimate request to the seller terminal 140 through the estimate request list as shown in FIG. 5, in response to a request for the list from the seller terminal 140. In this case, the estimate request manager 240 may also provide the buyer reliability information based on estimate history information for other merchandise purchased by the buyer, as described above (e.g., "Diamond" or +20 points), to the seller terminal 140, so that the seller can refer to such information to determine whether to participate in the estimate production (S840). For example, the seller can view the estimate request by clicking on detailed information in the buyer item displayed on the estimate request list of FIG. 5.

Figure 6:
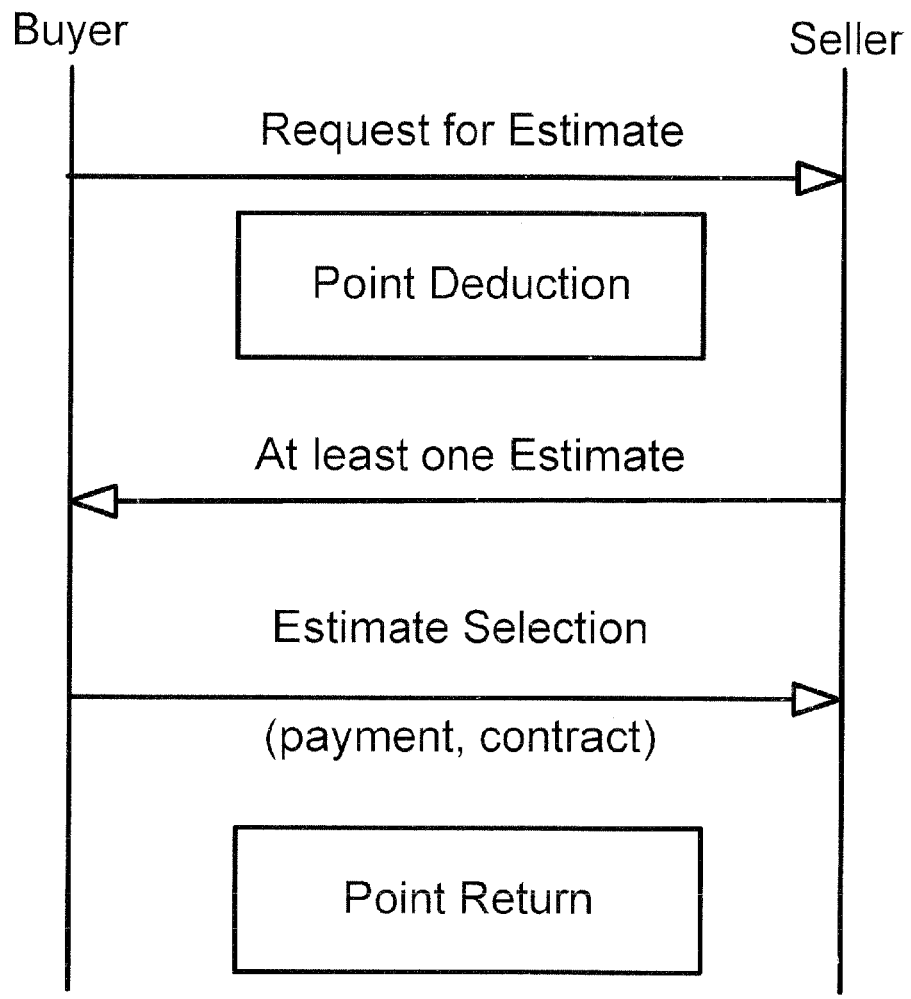
FIG. 6 illustrates a relationship between an estimate request by a buyer and an estimate response by a seller according to an exemplary embodiment of the present invention.

The seller may respond with an estimate produced in a predetermined form, using the seller terminal 140, by confirming the estimate request and the buyer reliability information. In addition, in response to the estimate request from the buyer terminal 130, the seller may respond via an option on the estimate request list (shown in FIG. 5) so that an estimate is automatically produced. Upon receipt of the estimate response from the seller terminal 140, the estimate provider 260 may provide the buyer with at least one estimate, as shown in FIG. 6.

For example, the estimate provider 260 may provide the buyer with an estimate including all information corresponding to each item selected by the buyer upon an estimate request. When a plurality of items are selected by the buyer upon the estimate request, the estimate provider 260 may combine and provide one or more estimates including information corresponding to respective items excluding at least one item. For example, in FIG. 4, when there is a request for purchase of one Hyundai™ car, sedan, 2500 cc or less, an estimate including various specifications of Hyundai Grandeur™, Santa Fe™, etc. may be provided as shown in FIG. 7. In addition, an estimate including other specifications of a KIA Mohave™ of similar engine displacement provided by the seller may be provided.

When the seller terminal 140 requests an automatic estimate response, the estimate provider 260 may receive and provide the estimates produced automatically and transmitted by the seller terminal 140, or the estimate provider 260 of the server 120 may automatically produce and provide the combination estimates in response to the estimate request. The estimate may be automatically produced in a predetermined format by a previously set function according to option items merchandise, such as maker, model, engine displacement, etc., or a purchase number item such as the number of cars. When the seller terminal 140 requests an input estimate response, combination estimates directly input by the seller through the seller terminal 140 may be transmitted to the server 120. The estimate provider 260 may then provide combination estimates to the buyer.

In response to the estimate request from the buyer, the estimate provider 260 may provide various estimates as a list or an enumeration on one screen, to the buyer terminal 130. FIG. 7 presents an exemplary interface for presenting various estimates according to one embodiment of the present invention. Other techniques for presenting estimates on the buyer terminal 130 will be obvious to one skilled in the art and may be used with the present invention.

The buyer may review each estimate and select a desired one to request purchase. Upon receipt of the purchase request, the point manager 250 may return the points deducted to the buyer, and enable the seller to deliver the contract merchandise through billing calculation by the billing processor 270, payment by the payment processor 290, and contract report to the seller by the transaction broker 230. In a particular embodiment of the invention, the point manager 250 may return the points deducted upon the purchase request to the buyer when there is no estimate response from a seller within a predetermined period, following the estimate request from the buyer.

The billing processor 270 may perform billing at an estimate price determined by the seller according to a discount rate in advance when the buyer orders a plurality of merchandise at one time using one estimate, or at a price determined according to a previously registered discount rate when the buyer orders a plurality of merchandise through several orders using a plurality of estimates before the seller delivers the merchandise. For example, in FIG. 4, when the buyer orders a plurality of merchandise at one time using one estimate, an estimate price determined by the seller according to a discount rate may be charged, or when the buyer orders a plurality of merchandise through several orders using a plurality of estimates before the seller delivers the merchandise, a price determined according to a previously registered discount rate may be charged. The payment processor 290 may perform a payment process based on billing calculated by the billing processor 270.

According to the merchandise estimate request and response service in the on-line market server 120, the buyer and the seller can advantageously use electronic commerce at no extra charge, and a potential customer can be directly connected with a merchandise specialist at a seller side, thereby reducing the overall cost of shopping in an on-line market, including the time and effort required to perform tasks such as merchandise searching, comparison, determination, and the like, and guaranteeing better satisfaction and usefulness of shopping results. This fosters widespread electronic commerce for all merchandise, including merchandise that cannot easily be traded on-line due to properties of markets and goods or related laws.

Meanwhile, all the estimates provided by the estimate provider 260 as described above may be stored and managed as an estimated merchandise list of a seller in the estimated merchandise DB 213. Accordingly, when the buyer terminal 130 requests a search form or a merchandise sale screen of the seller, the estimated merchandise manager 280 may load previous estimates extracted from the estimated merchandise list stored in the estimated merchandise DB 213, provide the extracted estimates to the buyer terminal 130. For example, when a keyword is "car," the estimates shown in FIG. 7 may be provided in a text form (including merchandise description according to estimate content) or a picture form (the estimate is zoomable by clicking), or when the buyer browses in a seller's mini-shop (e.g., a merchandise sale page). From the estimated merchandise list provided to the buyer terminal 130, the buyer may request purchase by directly selecting any one estimate and clicking on the 'purchase request' tag. Accordingly, the estimate request manager 240 enables the seller to deliver the contracted merchandise through subsequent processes, i.e., billing calculation by the billing processor 270, payment by the payment processor 290, and contract report to the seller by the transaction broker 230.

A method for brokering a merchandise transaction through estimate suggestion and response in the on-line market system 100 according to an exemplary embodiment of the present invention will now be described in greater detail with reference to the message flow diagram of FIG. 8.

First, estimate request information, such as the estimate request information shown in FIG. 4, to be used when the seller terminal 140 attempts to produce an estimate request for merchandise, is registered (S810). At the same time, a set deduction of cash points of a buyer requesting the estimate may also be registered. For example, the set deduction of cash points may comprise commodities such as cash, mileage, a stamp, a coupon which can be redeemed for cash, money, or a score, such as 1000. The estimate request manager 240 of the on-line market server 120 may store and manage content required upon an estimate request, such as estimate request information, a point deduction, and the like in the seller information DB 212 (S811). The estimate request information may be managed as several items so that a buyer can select various estimate options to be used for an estimate request according to features of the merchandise as illustrated in FIG. 4, instead of directly inputting the estimate options, for easy and efficient information exchange between the seller and the buyer. The option fields may be managed with several items so that various estimate options for the estimate request are selected according to features of the merchandise, instead of being directly input.

Meanwhile, the buyer may access the on-line market server 120 through the buyer terminal 130 and browse various merchandise registered by the seller on-line (S820). When the buyer attempts to make an estimate request via the buyer terminal 130 while browsing (S821), the buyer may designate and select merchandise whose estimate is to be requested and request the estimate request information (S822). In this case, the estimate request manager 240 may search for the seller information DB 212 (S823) and provide an estimate request screen including merchandise information and an estimate guide to the buyer terminal 130 (S824). Estimate request information for an estimate request including a plurality of option items required for an estimate request as shown in FIG. 4 may be included on the estimate request screen of the buyer terminal 130. At this point, a deduction of cash points by the point manager 250 may occur on the condition that the deducted cash points are returned when there is no estimate response from a seller within a predetermined period or upon a purchase request. The buyer may select fields of relevant items among a plurality of option items on the screen as shown in FIG. 4, so that content required for a desired estimate is included (S830). For example, a buyer desiring to purchase a car may select desired items in fields of option items for goods or services as merchandise, such as a maker, a model, and an engine displacement, and also select a number in a field of a purchase number item, such as the number of cars, as illustrated in FIG. 4. When all the required items are selected, the buyer may click on the 'estimate request' tag via the buyer terminal 130 and transmit the estimate request including the selection information (S831). When the estimate request is received from the buyer terminal 130, the point manager 250 deducts a predetermined amount of points from the reserve cash points of the buyer (S832). In deducting the cash points, the buyer may select any one to be deducted among transferred cash, reserve cash, mileage, a stamp, and a coupon prior to clicking on the 'estimate request' tag, or the seller may set the type and amount of deduction required for a particular estimate as discussed above.

When necessary fields of option items in the estimate request information (e.g., option items or a purchase number item for goods or services as merchandise) are all selected and the estimate request is received from the buyer terminal 130, the estimate request manager 240 delivers an the estimate request including the corresponding content to a related seller, and stores and manages the estimate request in the seller DB so that the seller can respond to the estimate request (S833, S834).

The estimate request manager 240 may provide an estimate request to the seller terminal 140 through the estimate request list as shown in FIG. 5, in response to a request for the list from the seller terminal 140. In this case, the estimate request manager 240 may also provide the buyer reliability information based on the estimate history information for other merchandise, as described above (e.g., "Diamond" or +20 points), to the seller terminal 140, so that the seller can refer to such information to determine whether to participate in the estimate production. For example, when clicking on detailed information in the buyer item of the estimate request list of FIG. 5, one may view the estimate request from the buyer, and the seller may confirm the estimate request and buyer reliability information, produce an estimate according to a predetermined format, and respond with the estimate through the seller terminal 140 (S840). In addition, the seller may respond with the estimate automatically produced through the estimate request list as shown in FIG. 5 in response to the estimate request from the buyer terminal 130 (S840). According to the estimate response from the seller terminal 140, the estimate provider 260 may provide at least one estimate to the buyer that corresponds to the request as shown in FIG. 6 (S841).

When the seller terminal 140 requests automatic estimate response, the estimate provider 260 receives the estimates automatically produced and transmitted from the seller terminal 140 and provides the estimates, or the estimate provider 260 of the server 120 may automatically produce and provide various combination estimates as shown in FIG. 7 in response to the estimate request. The estimate may be automatically produced in a predetermined format by a previously set function according to an option item or a purchase number item for goods or services as merchandise. When the seller terminal 140 requests an input estimate response, various combination estimates directly input by the seller through the seller terminal 140 may be transmitted to the server 120. The estimate provider 260 may provide the combination estimates to the buyer (S843). Here, the estimate may be an estimate including all information corresponding to each item selected by the buyer upon an estimate request, or may be at least one estimate including information corresponding to respective items excluding one or more items when a plurality of items are selected by the buyer upon the estimate request. For example, in FIG. 4, when there is a request for purchase of one Hyundai™ car, sedan, and 2500 cc or less, an estimate including various specifications of Hyundai Grandeur™, Santa Fe™, etc. may be provided as shown in FIG. 7. In addition, an estimate including other specifications of a KM Mohave™ of similar engine displacement provided by the seller may be provided.

The estimates provided by the estimate provider 260 may be stored and managed in the seller information DB 212, the buyer information DB 211; and the estimated merchandise DB 213 (S842). The buyer may confirm, on a buyer screen, various estimates that the estimate provider 260 provides as a list or an enumeration through the screen to the buyer terminal 130 in response to the estimate request from the buyer. After reviewing contents of various estimates, the buyer may (S850) reject the estimate (S851) or select at least one of the estimates for a purchase request (S851, S860). A lack of purchase request may also be considered an estimate rejection. In this case, the deducted points are not returned, and repetitive bad activities can be blocked such as by reducing buyer reliability in the buyer DB (S851).

The billing processor 270 may perform billing at an estimate price determined by the seller according to a discount rate in advance when the buyer orders a plurality of merchandise at one time using one estimate, or at a price determined according to a previously registered discount rate when the buyer orders a plurality of merchandise through several orders using a plurality of estimates before the seller delivers the merchandise. For example, in FIG. 4, when the buyer orders a plurality of merchandise at one time using one estimate, an estimate price determined by the seller according to a discount rate may be charged, or when the buyer orders a plurality of merchandise through several orders using a plurality of estimates before the seller delivers the merchandise, a price determined according to a registered discount rate may be charged. The payment processor 290 may perform a payment process based on billing calculated by the billing processor 270 (S870).

After the payment is performed, the transaction broker 230 may update the content in the buyer DB, the seller information DB 212, and the like and report the contract to the seller terminal 140 (S871, S872). Also, at this time, the point manager 250 may return the points deducted upon purchase request to the buyer (S873). The point manager 250 may also return the points deducted upon the purchase request to the buyer when there is no estimate response from a seller within a predetermined period, e.g., within a week, following the estimate request from the buyer. After receiving the contract report on the report screen through the seller terminal 140, the seller may deliver merchandise related to the estimate to the buyer, or provide services intellectual or physical, such as interior construction or legal services to the buyer (S874).

According to the merchandise estimate request and response service in the on-line market server 120, the buyer and the seller can advantageously use electronic commerce at no extra charge, and a potential customer can be directly connected with a merchandise specialist at a seller side, thereby reducing the overall cost of shopping in an on-line market, including the time and effort required to perform tasks such as merchandise searching, comparison, determination, and the like, and guaranteeing better satisfaction and usefulness of shopping results. This fosters widespread electronic commerce for all merchandise, including merchandise that cannot easily be traded on-line due to properties of markets and goods or related laws.

After receiving and using the merchandise from the seller, the buyer may evaluate seller delivery service and quality of the merchandise to input a buyer evaluation on a buyer screen (S880). The transaction broker 230 may manage the buyer evaluation, e.g., seller delivery-related satisfaction, merchandise quality satisfaction, price satisfaction, and the like indicated by levels of Very Satisfied, Satisfied, Neutral, or Dissatisfied for the merchandise or the seller (S881). When the buyer decides to purchase the delivered merchandise instead of requesting return or refund, the payment processor 290 of the on-line market server 120 may deduct a predetermined commission determined according to a policy from the merchandise price and send the remaining money to a seller account (S882).

Figure 9:
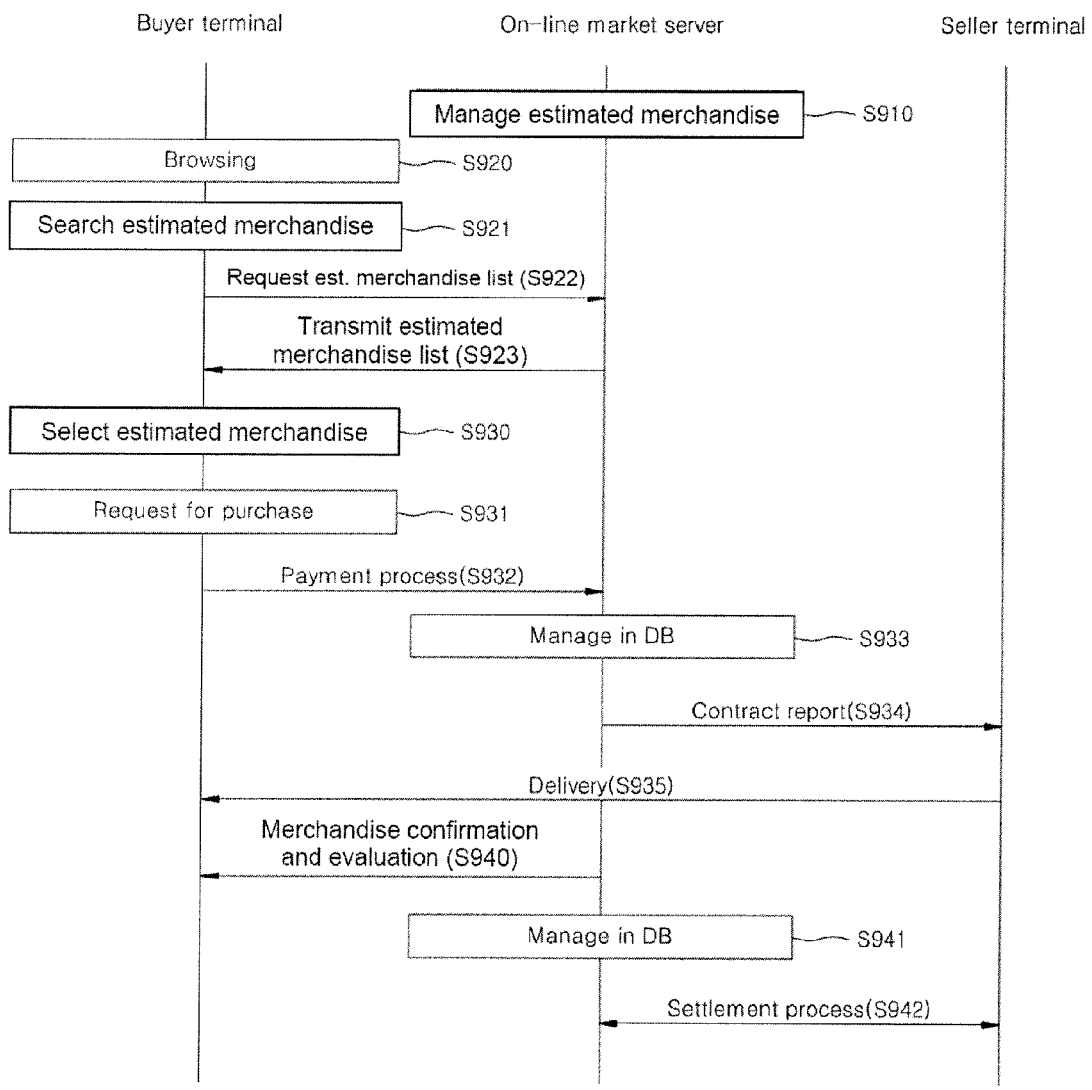
FIG. 9 is a message flow diagram illustrating a method for brokering a merchandise transaction in an on-line market system using an estimate as information for a purchase request according to an exemplary embodiment of the present invention.

A transaction brokerage method in the on-line market system 100 using an estimate as information for a purchase request according to an exemplary embodiment of the present invention will now be described in greater detail with reference to the message flow diagram of FIG. 9.

Figure 8:
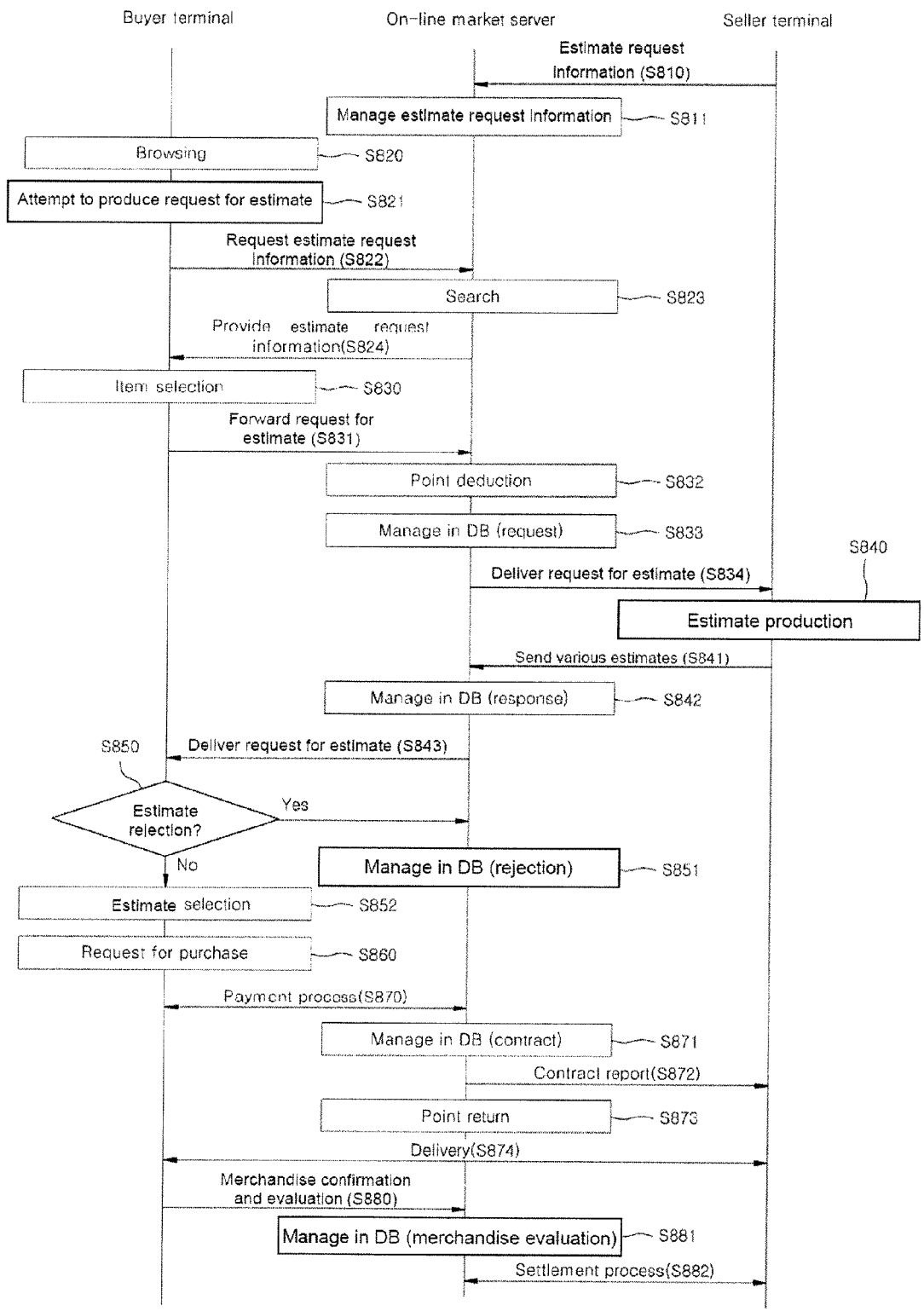
FIG. 8 a message flow diagram illustrating a method for brokering a merchandise transaction through an estimate request and response in an on-line market system according to an exemplary embodiment of the present invention.

In step S842 of FIG. 8, all estimates managed by the estimate provider 260 may be stored and managed as an estimated merchandise list of a seller in the estimated merchandise DB 213 (S910). Accordingly, when the buyer browses merchandise (S920), searches for merchandise on the estimates (S921), and requests a search form or a seller merchandise sale screen via the buyer terminal 130 (S922), the estimated merchandise manager 280 may provide the estimated merchandise list extracted from the estimated merchandise DB 213 to the buyer terminal 130 (S923). For example, when a keyword "car" is entered at the buyer terminal 130, the estimated merchandise list shown in FIG. 7 may be provided in a text form (including merchandise description according to estimate content) or a picture form (the estimate is zoomable by clicking), or when the buyer browses in a seller's mini-shop (e.g., a merchandise sale page.

The buyer may directly select any one estimate from the estimated merchandise list provided to the buyer terminal 130 and click on the 'purchase request' tag to request the purchase (S930, S931). Accordingly, the estimate request manager 240 enables the seller to deliver the contracted merchandise through subsequent processes, i.e., billing calculation by the billing processor 270, payment by the payment processor 290, and contract report to the seller by the transaction broker 230 (S932, S933, S934, S935). This is similar to that illustrated in FIG. 8, and the merchandise evaluation management or settlement process is similar to that illustrated in FIG. 8 (S940, S941, S942).

The functions used in the method and system disclosed in this specification may be implemented as computer-readable code on a computer-readable recording medium.

The computer-readable recording medium may include any of all kinds of recording devices that store computer-readable data. Examples of the computer-readable recording medium include a read-only memory (ROM), a random access memory (RAM), a compact disk-read only memory (CD-ROM), a magnetic tape, a floppy disk, and optical data storage. Another example of the medium is carrier waves (e.g., Internet transmission). Further, the computer-readable recording medium may be distributed over networked computer systems so that the computer-readable code can be stored and executed in a de-centralized manner.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

With a method and system for providing electronic commerce according to the present invention, a buyer can request an estimate based on information, e.g., previously registered merchandise or options for overcoming a minor difference of merchandise rather than a price, which are registered by a seller to allow the buyer to select items in requesting the estimate on-line, and can select a desired estimate from a corresponding estimate and related estimates from the seller, pay a price of merchandise, and receive delivered merchandise, thereby diversifying markets, providing strategic estimates for sale induction, acquiring more seller members in open markets, and fostering widespread electronic commerce.

In addition, an on-line-estimate request and selection may require reserve cash, mileage, stamps, coupons, or other cash points of a buyer, which are returned upon purchase/payment, such that only potential buyers can receive meaningful estimates and time and efforts for unnecessary estimate response by the seller can be reduced.

Furthermore, estimates provided by a seller and managed in database are used as information for a purchase request, such that the buyer can directly select the estimate and purchase merchandise based only on contents of the estimate.

Embodiments of the invention are not limited to the configurations and methods of the exemplary embodiments described above, and all or some of the exemplary embodiments may be selectively combined to yield variants. Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for providing electronic commerce through an estimate request and response, the method comprising:
   receiving, via a communication interface of an on-line market server, an estimate request from a buyer terminal selecting at least one of a plurality of option items from estimate request information registered on the on-line market server and associated with a seller terminal;
   in response to receiving the estimate request, the on-line market server deducts cash points from an account of a user of the buyer terminal, the account being controlled by the on-line market server;
   receiving an estimate response from the seller terminal in response to the estimate request from the buyer terminal;

providing, via the communication interface of the on-line market server, at least one estimate to the buyer terminal according to the estimate response from the seller terminal; and receiving a purchase request from the buyer terminal in response to the estimate and performing a corresponding process;

in response to receiving the purchase request from the buyer terminal, the on-line market server returns the cash points to the account of the user.

2. The method of claim 1, further comprising:
storing the estimate in a database; and
providing the estimate to the buyer terminal upon receipt of a request from the buyer terminal, so that the estimate can be directly selected for purchase.

3. The method of claim 1, wherein the estimate request comprises the plurality of option items selected by the buyer terminal or a purchase number item for goods or services as merchandise.

4. The method of claim 1, wherein the estimate provided describes merchandise meeting all of the option items selected by the buyer terminal or a combination of one or more estimates is provided describing merchandise excluding at least one option item selected by the buyer terminal.

5. The method of claim 1, wherein the receiving of the estimate response from the seller terminal and the providing, via the communication interface of the on-line market server, of the at least one estimate comprises:

receiving a selected estimate response option from the seller terminal after providing the estimate request to the seller terminal;

when the selected estimate response option received from the seller terminal is an automatic estimate response option, automatically producing the at least one estimate through an estimate provider of the on-line market server and providing the automatically produced at least one estimate to the buyer; and when the selected estimate response option received from the seller terminal is an input estimate response option, providing an estimate input by the seller terminal in response to the estimate request to the buyer.

6. The method of claim 1, wherein the performing of the corresponding process comprises receiving a purchase request for merchandise described in the estimate and receiving payment for the merchandise.

7. The method of claim 1, further comprising performing billing and receiving payment at an estimate price determined by the seller according to a discount rate in advance when the buyer orders a plurality of merchandise at one time using one estimate, or at a price determined according to a discount rate previously registered by the seller when the buyer orders a plurality of merchandise through several orders using a plurality of estimates before the seller delivers the merchandise.

8. One or more non-transitory computer-readable media having computer-executable instructions embodied thereon which when executed cause at least one computer processor to perform a method for providing electronic commerce through an estimate request and response, the method comprising:

receiving, via a communication interface of an on-line market server, an estimate request from a buyer terminal selecting at least one of a plurality of option items from estimate request information registered on the on-line market server and associated with a seller terminal;

in response to receiving the estimate request, the on-line market server deducts cash points from an account of a user of the buyer terminal, the account being controlled by the on-line market server;

receiving an estimate response from the seller terminal in response to the estimate request from the buyer terminal;

providing, via the communication interface of the on-line market server, at least one estimate to the buyer terminal according to the estimate response from the seller terminal; and receiving an estimate rejection or a purchase request from the buyer terminal in response to the estimate and performing a corresponding process;

in response to receiving the purchase request from the buyer terminal, the on-line market server returns the cash points to the account of the user.

9. The media of claim 8, the method further comprising:
storing the estimate in a database; and
providing the estimate to the buyer terminal upon receipt of a request from the buyer terminal, so that the estimate can be directly selected for purchase.

10. The media of claim 8, wherein the estimate provided describes merchandise meeting all of the option items selected by the buyer terminal or a combination of one or more estimates is provided describing merchandise excluding at least one option item selected by the buyer terminal.

11. The media of claim 8, wherein the receiving of the estimate response from the seller terminal and the providing, via the communication interface of the on-line market server, of the at least one estimate comprises:

receiving a selected estimate response option from the seller terminal after providing the estimate request to the seller terminal;

when the selected estimate response option received from the seller terminal is an automatic estimate response option, automatically producing the at least one estimate through an estimate provider of the on-line market server and providing the automatically produced at least one estimate to the buyer; and when the selected estimate response option received from the seller terminal is an input estimate response option, providing an estimate input by the seller terminal in response to the estimate request to the buyer.

12. The media of claim 8, the method further comprising performing billing and receiving payment at an estimate price determined by the seller according to a discount rate in advance when the buyer orders a plurality of merchandise at one time using one estimate, or at a price determined according to a discount rate previously registered by the seller when the buyer orders a plurality of merchandise through several orders using a plurality of estimates before the seller delivers the merchandise.

13. An on-line market system that supports electronic commerce, the system comprising:

a communication interface for receiving input from and transmitting output to a seller terminal and a buyer terminal;

a processor connected to the communication interface;

an estimate request manager configured to register estimate request information including a plurality of option items associated with the seller terminal, provide to the buyer terminal, via the communication interface and the processor, the estimate request information upon receipt of a request from the buyer terminal, receive an estimate request, from the buyer terminal via the communication interface and the processor, made by a buyer selecting at least one of the plurality of option items, and provide the estimate request to the seller terminal, via the communication interface and the processor;

an estimate provider configured to receive an estimate response from the seller terminal in response to the estimate request, and provide, via the communication interface and the processor, at least one estimate to the buyer terminal according to the estimate response from the seller terminal in response to the estimate request, wherein the estimate request manager is configured to receive, from the buyer terminal via the communication interface and the processor, an estimate rejection or a purchase request in response to the at least one estimate and controls performing a corresponding process; and a point manager configured to receive the estimate request via the communication interface and the processor and deduct a predetermined amount of points from an account of the buyer upon receipt of the estimate request, the point manager further configured to receive the estimate rejection or the purchase request via the communication interface and the processor and return the deducted predetermined amount of points upon receipt of the purchase request in response to receiving the purchase request.

14. The system of claim 13, further comprising:

a billing processor for performing billing at an estimate price discounted in advance by the seller when the buyer orders a plurality of merchandise at one time using one estimate, or at a price determined according to a discount rate previously registered by the seller when the buyer orders a plurality of merchandise through several orders using a plurality of estimates before the seller delivers the merchandise; and a payment processor for performing a payment process according to the billing calculated by the billing processor.

15. The system of claim 13, further comprising:

a database storing at least one estimate as an estimated merchandise list of a seller; and an estimated merchandise manager for providing the estimated merchandise list extracted from the database to a terminal upon receipt of a request from the terminal, wherein the estimate request manager processes a purchase requested by the terminal by directly selecting an estimate from the estimated merchandise list.

* * * * *